US012808610B2

(12) United States Patent
Tydén et al.

(10) Patent No.: US 12,808,610 B2
(45) Date of Patent: Nov. 24, 2026

(54) ATTACHMENT MEMBER AND HEAT TRANSFER PLATE

(71) Applicant: Alfa Laval Corporate AB, Lund (SE)

(72) Inventors: Emil Tydén, Södra Sandby (SE); Mats Olsson, Bjärred (SE); Per Wänersjö, Lund (SE)

(73) Assignee: ALFA LAVAL CORPORATE AB, Lund (SE)

( * ) Notice: Subject to any disclaimer, the term of this patent is extended or adjusted under 35 U.S.C. 154(b) by 219 days.

(21) Appl. No.: 18/562,925

(22) PCT Filed: May 13, 2022

(86) PCT No.: PCT/EP2022/063036
§ 371 (c)(1),
(2) Date: Nov. 21, 2023

(87) PCT Pub. No.: WO2022/248250
PCT Pub. Date: Dec. 1, 2022

(65) Prior Publication Data

US 2024/0280333 A1 Aug. 22, 2024

(30) Foreign Application Priority Data

May 28, 2021 (EP) .................................... 21176557

(51) Int. Cl.
*F28F 3/10* (2006.01)
*F16J 15/06* (2006.01)
*F28D 9/00* (2006.01)

(52) U.S. Cl.
CPC .............. *F28F 3/10* (2013.01); *F28D 9/0037* (2013.01); *F16J 15/061* (2013.01)

(58) Field of Classification Search
CPC ........... F28F 3/10; F28D 9/0037; F16J 15/061
See application file for complete search history.

(56) References Cited

U.S. PATENT DOCUMENTS 4,377,204 A * 3/1983 Johansson ................. F28F 3/10 165/166
4,635,715 A * 1/1987 Andersson ................ F28F 3/10 403/375

(Continued)

FOREIGN PATENT DOCUMENTS

CN 202304548 U 7/2012
CN 111587353 A 8/2020

(Continued)

OTHER PUBLICATIONS

Translation of JP2000097583A named Translation—JP2000097583A (Year: 2000).*

(Continued)

*Primary Examiner* — Paul Alvare
(74) *Attorney, Agent, or Firm* — BUCHANAN INGERSOLL & ROONEY PC

(57) ABSTRACT

An attachment member for fastening a gasket to a heat transfer plate includes a bridge, a first connection member, a second connection member and a finger. The first and second connection members engage the bridge and are arranged to engage the gasket. The finger engages the bridge and extends between the first and second connection members. The first connection member includes first and second portions, the second portion being arranged between the bridge and the first portion. The second portion of the first connection member includes a second body, and the first portion of the first connection member includes a first body and a first retainer projecting from a longitudinal outer side of the first body in a direction away from the finger to give the first portion of the first connection member a first width larger than a second width of the second portion of the first connection member.

13 Claims, 5 Drawing Sheets

(56) References Cited

U.S. PATENT DOCUMENTS

| | | | | | |
|---|---|---|---|---|---|
| 5,178,212 | A * | 1/1993 | Nakamura | F28F 3/10 165/166 |
| 6,186,224 | B1 | 2/2001 | Seidel | |
| 6,935,415 | B1 * | 8/2005 | Petersen | F28F 3/10 165/166 |
| 10,451,361 | B2 | 10/2019 | Rasmussen | |
| 10,544,998 | B2 | 1/2020 | Hedberg et al. | |
| 2015/0330720 | A1 * | 11/2015 | Hedberg | F28D 9/005 165/76 |
| 2016/0282060 | A1 * | 9/2016 | Rasmussen | F28D 9/0093 |
| 2019/0219341 | A1 * | 7/2019 | Petersen | F28D 9/005 |
| 2019/0390923 | A1 | 12/2019 | Rasmussen | |
| 2021/0318080 | A1 * | 10/2021 | Siemienczuk | F28F 3/10 |
| 2023/0228502 | A1 * | 7/2023 | Seidel | F28F 3/083 165/166 |

FOREIGN PATENT DOCUMENTS

| | | | | |
|---|---|---|---|---|
| EP | 2762823 | A1 | | 8/2014 |
| EP | 2886998 | A1 | | 6/2015 |
| EP | 3182048 | A1 | | 6/2017 |
| EP | 3640576 | A1 | | 4/2020 |
| JP | S60-501568 | | | 9/1985 |
| JP | H03-30076 | U | | 3/1991 |
| JP | 2000097583 | A | * | 4/2000 |
| JP | 2002-519614 | A | | 7/2002 |
| JP | 2003-502611 | A | | 1/2003 |
| JP | 2017-500531 | A | | 1/2017 |
| JP | 2018-044764 | A | | 3/2018 |
| WO | 99/67589 | A2 | | 12/1999 |
| WO | 00/77468 | A1 | | 12/2000 |
| WO | 2004072570 | A1 | | 8/2004 |
| WO | 2010092556 | A1 | | 8/2010 |
| WO | 2015/090931 | A1 | | 6/2015 |
| WO | 2019/140044 | A1 | | 7/2019 |
| WO | 2019224537 | A1 | | 11/2019 |

OTHER PUBLICATIONS

International Search Report (PCT/ISA/210) and Written Opinion (PCT/ISA/237) mailed on Aug. 17, 2022 by the European Patent Office as the International Searching Authority for International Application No. PCT/EP2022/063036. (13 pages).

Office Action (Notice of Preliminary Rejection) issued on Nov. 14, 2025, in corresponding Korean Patent Application No. 10-2023-7044500 and English translation of the Office Action. (9 pages).

Office Action (Notice of Reasons for Refusal) issued on May 20, 2025, in corresponding Japanese Patent Application No. 2023-573248 and English translation of the Office Action. (12 pages).

Notice of Reasons for Rejection issued on Feb. 3, 2026, by the Japanese Patent Office in corresponding Japanese Patent Application No. 2025-074606 and an English translation of the Notice. (14 pages).

Office Action issued on Jul. 31, 2026 by the Chinese Patent Office in Chinese Patent Application No. 202280037155.5 and an English translation of the Office Action. (14 pages).

* cited by examiner

ATTACHMENT MEMBER AND HEAT TRANSFER PLATE

TECHNICAL FIELD

The invention relates to an attachment means for fastening a gasket to a heat transfer plate, and to a heat transfer plate arranged to cooperate with such an attachment means.

BACKGROUND ART

Plate heat exchangers, PHEs, typically comprises two end plates in between which a number of heat transfer plates are arranged in an aligned manner, i.e. in a stack or pack. In one type of well-known PHEs, the so called gasketed PHEs, gaskets are arranged between the heat transfer plates in gasket grooves pressed in the heat transfer plates. Typically, the gasket grooves extend partially along and adjacent edges of the heat transfer plates. The end plates, and therefore the heat transfer plates, are pressed towards each other by some kind of tightening means, whereby the gaskets seal between the heat transfer plates. Parallel flow channels, defined by the gaskets, are formed between the heat transfer plates, one channel between each pair of adjacent heat transfer plates. Two fluids of initially different temperatures, which are fed to/from the PHE through inlets/outlets, may flow alternately through every second channel for transferring heat from one fluid to the other, which fluids enter/exit the channels through inlet/outlet portholes in the heat transfer plates communicating with the inlets/outlets of the PHE. In order for the channels not to leak it is naturally essential that the gaskets are properly positioned between the plates.

When the plate heat exchanger is closed, the gaskets are squeezed between the plates and thereby securely held in place. However, when the gaskets are not squeezed between the plates, such as when the plate heat exchanger is assembled or open for maintenance, some kind of means for fixing the gaskets correctly to the plates are desirable. It is known to use some kind of adhesive means, such as glue or tape, for fixing the gaskets to the plates. However, attaching the gaskets by adhesive, and replacing gaskets fastened by adhesive, may be relatively time-consuming and therefore expensive. Further, adhesive may negatively affect the gaskets and their sealing capacity. Also mechanical gasket fixing solutions are previously known, for example through applicant's own U.S. Pat. No. 4,635,715. This document discloses different embodiments of gaskets comprising projections for securing the gaskets to heat transfer plates. The gaskets described herein may provide relatively unreliable fastening to the heat transfer plates in that the engagement between the projections and the heat transfer plates is relatively weak with a risk of the projections "sliding off" the heat transfer plate.

SUMMARY

An object of the present invention is to provide an attachment means for fastening a gasket to a heat transfer plate, and a heat transfer plate arranged to engage with such an attachment means, that provides a more reliable gasket fastening as compared to prior art. The basic concept of the invention is construct the attachment means and the heat transfer plate such that they "inter-lock" when they engage with each other properly.

The attachment means and the heat transfer plate are defined in the appended claims and discussed below.

An attachment means according to the present invention is arranged to engage with an edge portion of a heat transfer plate for fastening a gasket to a first side of the heat transfer plate. It comprises a bridge, a first connection member, a second connection member and a finger. A first connection part of the first connection member is arranged to engage with the gasket, while a second connection part of the first connection member engages with the bridge. A first connection part of the second connection member is arranged to engage with the gasket, while a second connection part of the second connection member engages with the bridge. A connection part of the finger engages with the bridge. The finger extends between the first and second connection members and is arranged to extend from the bridge towards the gasket. The first connection member comprises a first and a second portion. The second portion is arranged between the bridge and the first portion. The attachment means is characterized in that the second portion of the first connection member comprises a second body and the first portion of the first connection member comprises a first body and a first retaining means projecting from a longitudinal outer side of the first body in a direction away from the finger and the second connection member. Thereby, the first portion of the first connection member is given a first width which is larger than a second width of the second portion of the first connection member.

The longitudinal outer side of the first body faces away from the finger while an opposing longitudinal inner side of the first body is arranged between the longitudinal outer side of the first body and the finger, and faces the finger.

Widths of the first and second connection members and the finger, as well as portions thereof, may be measured parallel to a length or longitudinal extension of the bridge.

The first and second widths of the first and second portions of the first connection member referred to above may be varying or constant.

The longitudinal outer side of the first body may extend essentially perpendicular to the longitudinal extension of the bridge.

The first body and the first retaining means may be integrally formed. Similarly, the first and second bodies may be integrally formed.

The finger may have a longitudinal symmetry axis which may extend essentially perpendicular to the longitudinal extension of, and through a center of, the bridge.

The first and second connection members may lack a longitudinal symmetry axis.

Thus, the attachment means according to the present invention has a first connection member with a width that is varying along at least a part of a length of the first connection member, so as to achieve a first connection member adapted to mechanically "self-lock", in at least one direction, in a heat transfer plate having a suitable design. This "self-lock" may firmly fix the attachment means to the heat transfer plate and prevent displacement of the attachment means in relation to the heat transfer plate, especially in a direction perpendicular to the width extension of the first connection member and parallel to an extension plane of the heat transfer plate. Thus, the inventive attachment means offers a reliable attachment to a heat transfer plate. Further, the inventive attachment means may be relatively easy to mount onto a heat transfer plate.

The attachment means may be so designed that the first portion of the first connection member comprises the first connection part of the first connection member. Then, the first portion of the first connection member will be arranged to border on the gasket. Further, the second portion of the first connection member may comprise the second connection part of the first connection member. Then, the second portion of the first connection member will border on the bridge.

The first retaining means of the first portion of the first connection member may be have many different shapes. According to one embodiment of the invention it is tapered in a direction away from the bridge along at least part of its length. Such a design may enable an optimized gasket support.

According to one embodiment of the invention, the first retaining means has, as seen from above the attachment means, the essential shape of a triangle, and the first retaining means is connected to the first body along one side of the triangle. Such a configuration may enable a well-defined and reliable fixing of the attachment means to a heat transfer plate having a suitable design.

The attachment means may be so designed that the second body has a smallest width which is smaller than a largest width of the first body. The widths of the first and/or second bodies may vary, or be constant and thus equal to said largest and smallest width, respectively. Such a design may enable an attachment means with a first connection member adapted to mechanically “self-lock”, in at least two opposite directions, in a heat transfer plate having a suitable design, and an even more firm fixing of the attachment means to the heat transfer plate. According to one embodiment of the invention, the second body of the first connection member is tapered in a direction towards the bridge along at least part of its length. Such a design may enable a smooth transition between the first and second bodies of the first connection member and, thus, a tractable and durable attachment means.

The attachment means may be so designed that a longitudinal outer side of the second body is essentially straight and extends essentially perpendicular in relation to the length extension of the bridge. The longitudinal outer side of the second body faces away from the finger while an opposing longitudinal inner side of the second body is arranged between the longitudinal outer side of the second body and the finger, and faces the finger. Such a design may enable a mechanically straight-forward construction of the attachment means.

The attachment means may be such that the finger comprises a first portion with a first width and a second portion with a second width. The second portion may be arranged closer to the bridge than the first portion, and the first width may be smaller than the second width. Such a design may render the attachment means more easy to bring into proper engagement with the heat transfer plate while the finger may still offer a relatively large plate contact surface, which, in turn, may enable an optimized plate engagement. Further, such a design may render the finger more flexible, which also may enable an optimized plate engagement. Furthermore, such a design may result in an adaptation of the shape of the finger to the shape of the first connection member, which, in turn, may enable a compact attachment means.

The first and second widths of the first and second portions of the finger referred to above may be varying or constant.

The attachment means may be so designed that the second portion of the finger comprises the connection part of the finger. Then, the second portion of the finger will border on the bridge.

The finger may be have many different shapes. According to one embodiment of the invention it is tapered in a direction away from the bridge along at least part of its length. Such a design may enable a smooth transition between the first and second portions of the finger and, thus, a tractable and durable attachment means.

The attachment means may be such that a maximum thickness of the first body is larger than a maximum thickness of the first retaining means. The thickness of the the first body and/or the thickness of the first retaining means may be constant or varying. Such a design may ensure that the first retaining means does not negatively affect a contact between the attachment means and and two heat transfer plates between which the gasket, which is arranged to engage with the attachment means, is arranged to be positioned.

Naturally, the second connection member of the attachment means may be designed like the first connection member of the attachment means.

A heat transfer plate according to the present invention comprises, on a first side thereof, a gasket groove extending along an edge of the heat transfer plate. An edge portion of the heat transfer plate extends between the edge and the gasket groove. The edge portion is corrugated so as to comprise, as seen from the first side of the heat transfer plate, alternately arranged ridges, which comprise a respective top portion, and valleys, which comprise a respective bottom portion. The edge portion comprises a gasket fastening area arranged to engage with an attachment means as defined above for fastening a gasket in the gasket groove. The heat transfer plate is characterized in that the gasket fastening area comprises first and second ones of the valleys and first and second ones of the ridges. The first and second ridges are arranged on opposite sides of the first valley, and the first and second valleys are arranged on opposite sides of the second ridge. The bottom portion of the first valley extends in a bottom plane. The top portion of the first ridge extends in a first plane within a first portion of the first ridge bordering on a first portion of the first valley, and in a top plane in a second portion of the first ridge bordering on a second portion of the first valley so as to extend between the first portion of the first ridge and the edge of the heat transfer plate. The top and bottom planes are separated by a distance x. The first plane extends essentially parallel to the top and bottom planes and at a distance xt from the top plane and a distance xb from the bottom plane, wherein $xt \leq x$ and $0 \leq xb < x$.

Widths of the first and second valleys and the first and second ridges, as well as portions thereof, may be measured parallel to the edge of the heat transfer plate.

The bottom portion of the first valley, just like the bottom portion of the second valley, may have a longitudinal symmetry axis which may extend perpendicular to the edge of the heat transfer plate.

The top portion of first ridge may lack a longitudinal symmetry axis.

The top portion of the second ridge may have a longitudinal symmetry axis which may extend perpendicular to the edge of the heat transfer plate.

Thus, the heat transfer plate according to the present invention has a gasket fastening area including a first ridge comprising a portion of lower press depth, i.e. a recess. The recess is arranged to accommodate a first retaining means of an attachment means having a suitable design so as to mechanically “lock”, in at least one direction, the attachment means to the heat transfer plate. This “lock” may firmly fix the attachment means to the heat transfer plate and prevent displacement of the attachment means in relation to the heat transfer plate, especially in a direction perpendicular to edge of the heat transfer plate and parallel to an extension plane of the heat transfer plate.

The heat transfer plate may be so designed that the first portion of the first ridge is tapered in a direction away from the edge of the heat transfer plate along at least part of its length.

The first portion of the first ridge may have the essential shape of a triangle as seen from above the heat transfer plate, and the first portion of the first ridge may border on the first portion of the first valley along one side of the triangle.

The second portion of the first valley, which second portion is arranged between the first portion of the first valley and the edge of the heat transfer plate, may have a smallest width which is smaller than a largest width of the first portion of the first valley. The widths of the first and/or second portions may vary, or be constant and thus equal to said largest and smallest width, respectively. According to one embodiment of the invention, the second portion of the first valley is tapered in a direction towards the edge of the heat transfer plate along at least part of its length.

A longitudinal outer side of the first valley may, within the second portion of the first valley, be essentially straight and extend essentially perpendicular in relation to the edge of the heat transfer plate. The longitudinal outer side of the first valley faces the first ridge while an opposing longitudinal inner side of the first valley faces away from the first ridge.

The second ridge may comprise a first portion with a first width and a second portion with a second width, the second portion being arranged between the first portion and the edge of the heat transfer plate. Further, the first width may be smaller than the second width. The first and second widths of the first and second portions of the second ridge may be varying or constant.

The second ridge may be tapered in a direction away from the edge of the heat transfer plate along at least part of its length.

The first and second valleys may be at least partly open towards the gasket groove. By this is meant that the first and second valleys, or more particularly the space defined by the first and second valleys, are in communication with the gasket groove, or more particularly the space defined by the gasket groove. Such a design may allow for the first and second connection members of the attachment means to connect to the gasket without effecting a sealing between an overlying heat transfer plate and the gasket. The first and second ridges may be closed towards, or separated from, the gasket groove. By this is meant that the first and second ridges, or more particularly the space defined by the first and second ridges, are not in communication with the gasket groove, or more particularly the space defined by the gasket groove. Such a design may allow complete gasket support at the first and second ridges.

The heat transfer plate and the attachment means according to the invention are adapted to be used together, and the design of the heat transfer plate is adapted to the design of the attachment means, and vice versa. Thus, the above different embodiments of the heat transfer plate according to the invention correspond to the above different embodiments of the attachment means according to the invention. Accordingly, the advantages of the above different embodiments of the attachment means are transferable to the above different embodiments of the heat transfer plate, and vice versa. Naturally, these advantages appear first when the heat transfer plate and the attachment means cooperate with each other.

Still other objectives, features, aspects and advantages of the invention will appear from the following detailed description as well as from the drawings.

BRIEF DESCRIPTION OF THE DRAWINGS

The invention will now be described in more detail with reference to the appended schematic drawings, in which.

DETAILED DESCRIPTION

Figure 1:
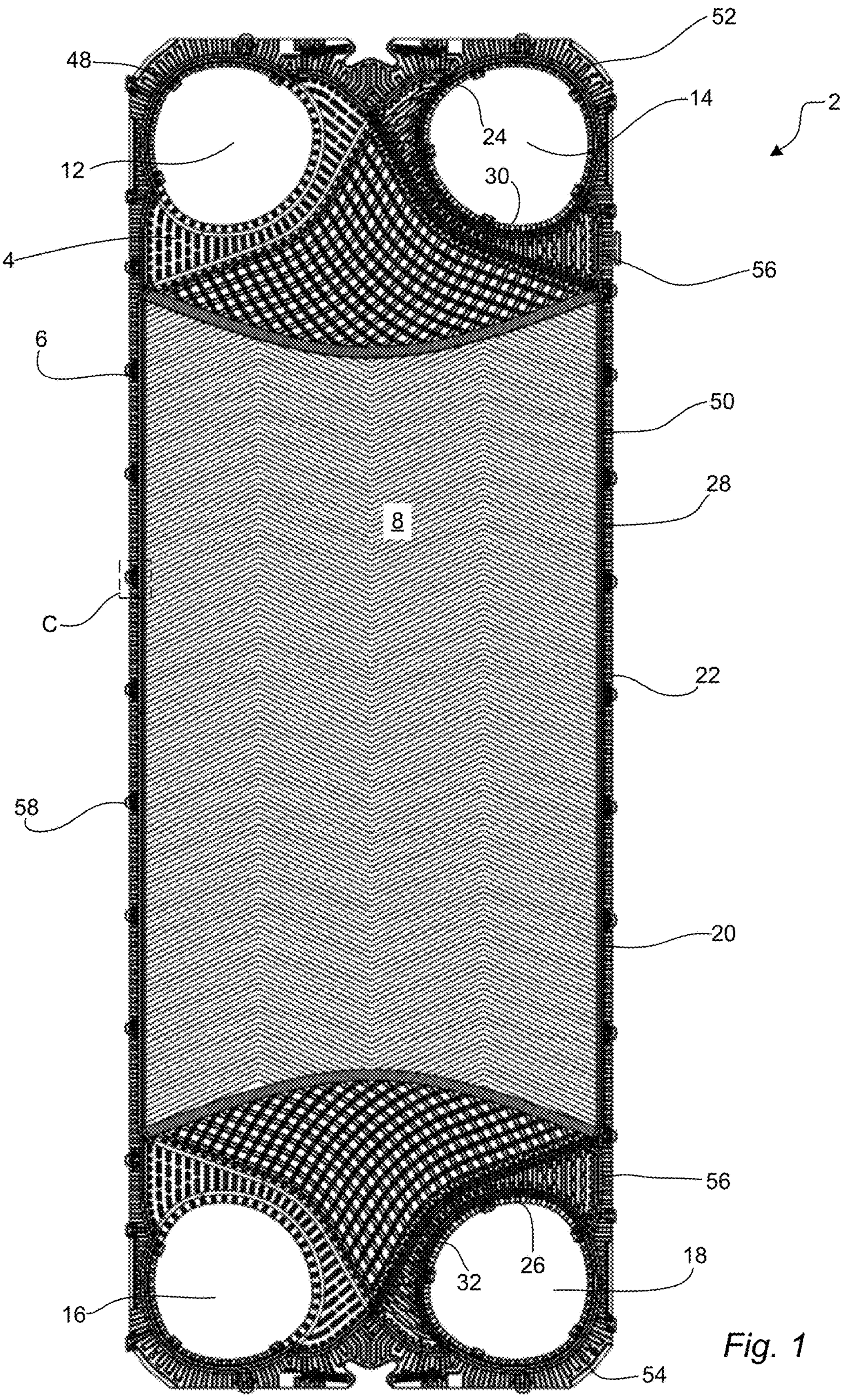
FIG. 1 is a plan view of an assembly comprising a heat transfer plate and a gasket arrangement.
Figure 2:
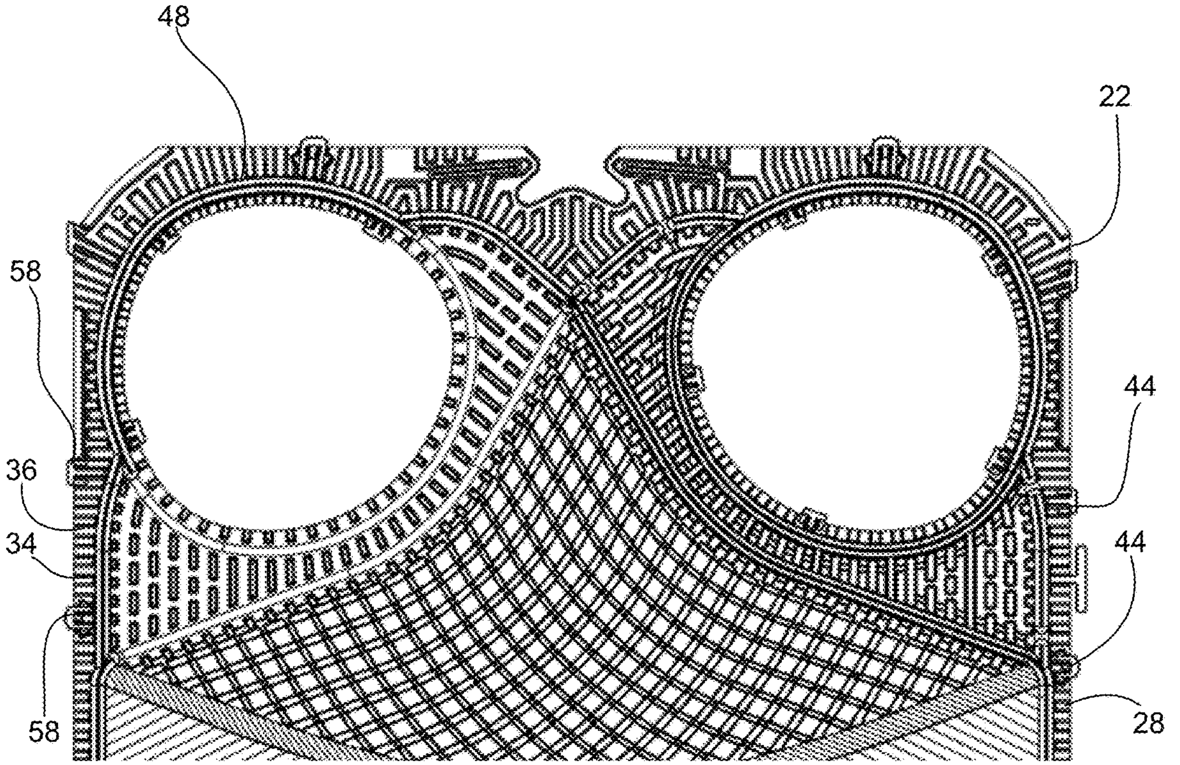
FIG. 2 is a partial enlargement of the assembly of FIG. 1.
Figure 3:
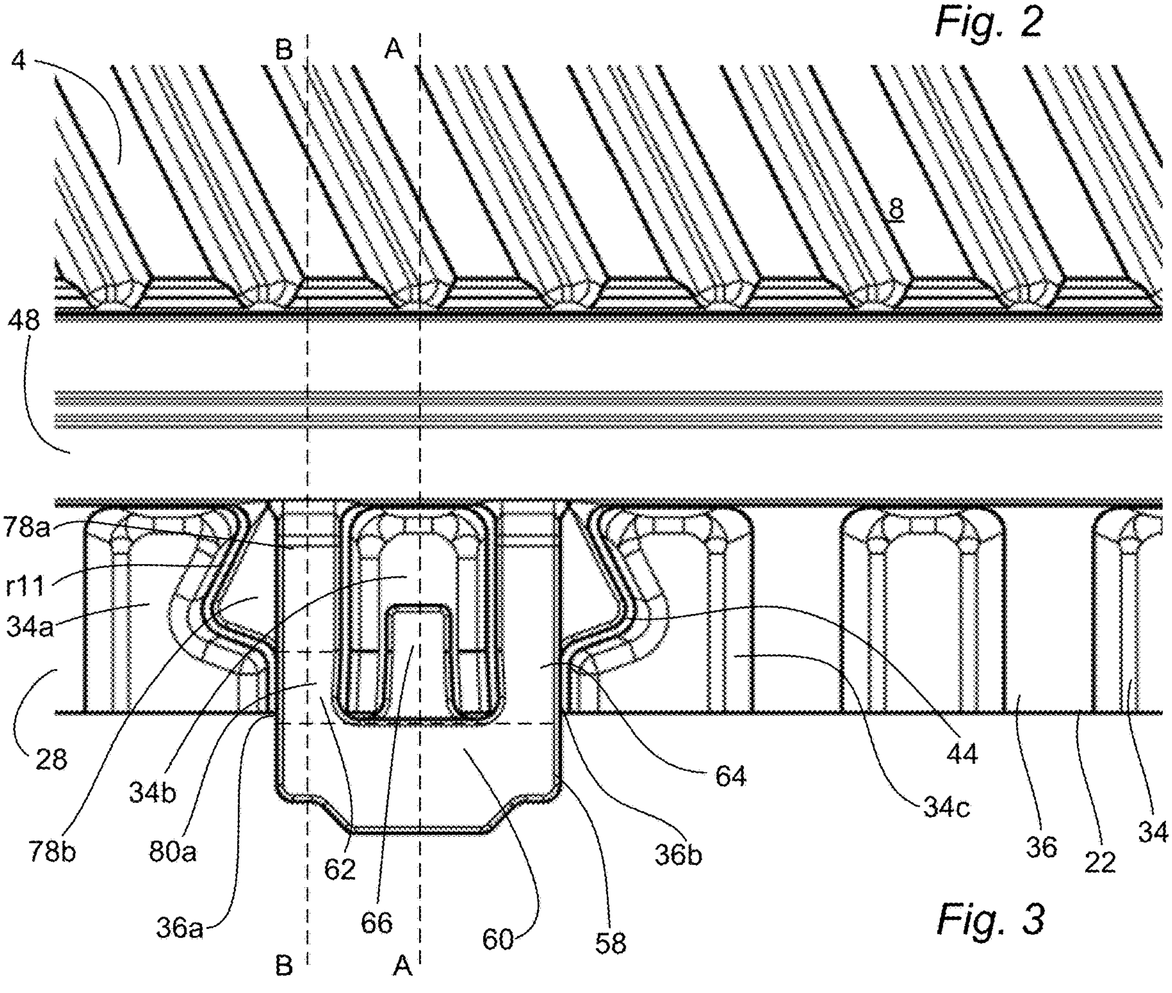
FIG. 3 is a partial further enlargement of the assembly of FIG. 1.

With reference to FIGS. 1-5, an assembly 2 comprising a heat transfer plate 4 and a gasket arrangement 6, is shown. FIG. 2 shows an enlargement of an upper part of the assembly 2 while FIG. 3 shows an enlargement of the area enclosed by the dashed rectangle C in FIG. 1.

Figure 4:
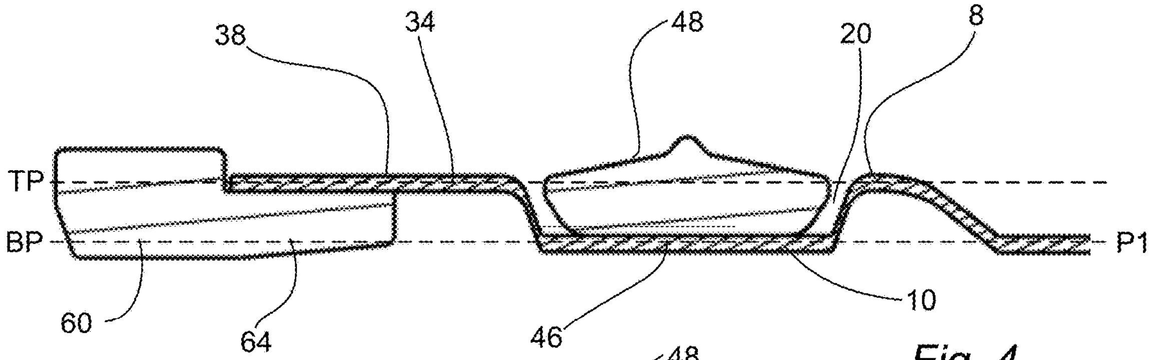
FIG. 4 schematically illustrates a cross section along line A-A in FIG. 3, FIG. 5 schematically illustrates a cross section along line B-B in FIG. 3, FIG. 6 corresponds to FIG. 3 but illustrates the heat transfer plate only.
Figure 5:
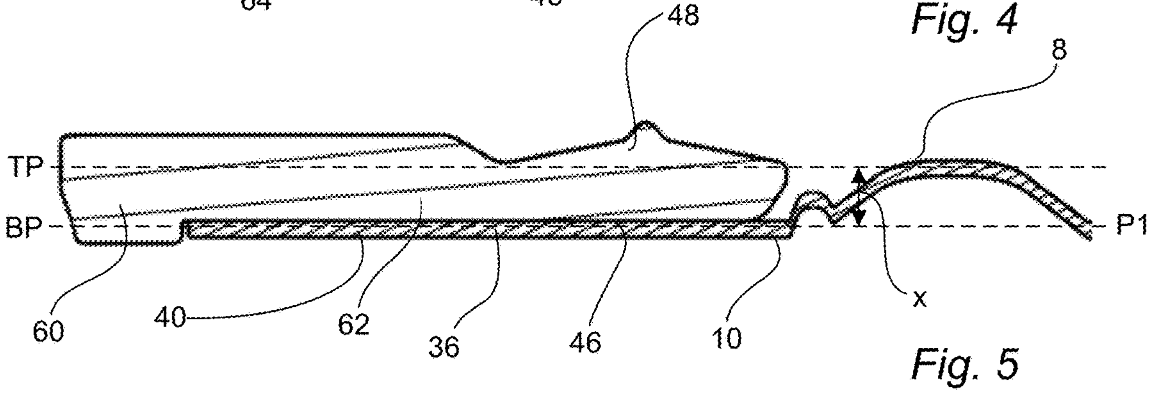
Figure 6:
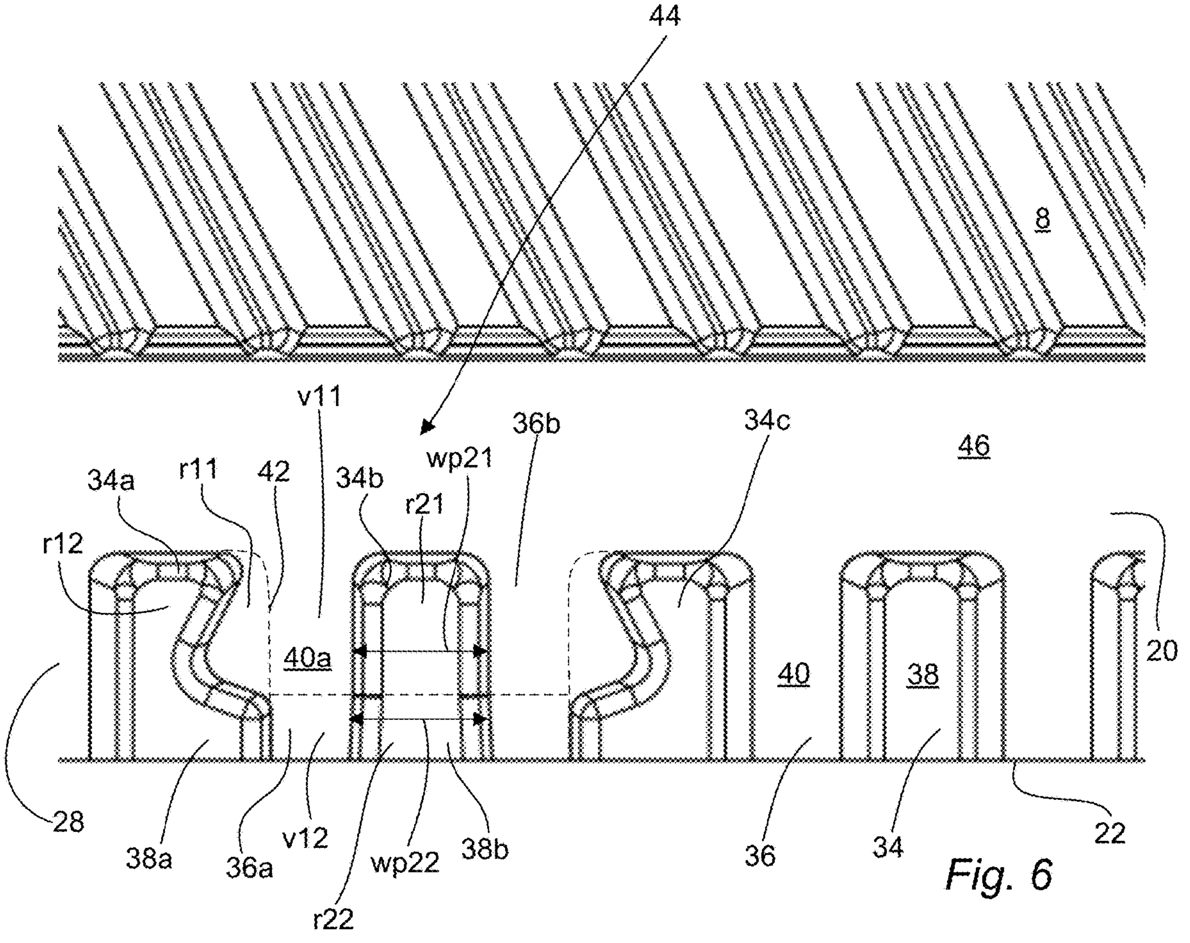

The heat transfer plate 4, which is separately illustrated in FIG. 6 and of which a first side 8 is visible in FIGS. 1-3 and 6, and an opposite second side 10 is illustrated in FIGS. 4 and 5, is an essentially rectangular sheet of stainless steel provided with a number of port holes 12, 14, 16 and 18, and pressed with specific patterns within different areas of the heat transfer plate. Pressed into the first side 8 of the heat transfer plate 4 is also a gasket groove 20 extending along an outer plate edge 22 to enclose the port holes 12, 14, 16 and 18, and completely along two inner plate edges 24 and 26 defining two of the port holes 14 and 18, respectively, to separately enclose these. Further, the gaskets groove 20 extends twice “diagonally” across the heat transfer plate so as to further enclose the port holes 14 and 18. An outer edge portion 28 of the heat transfer plate 4, extending between the outer plate edge 22 and the gasket groove 20, and inner edge portions 30 and 32 of the heat transfer plate 4, extending between the inner plate edge 24 and the gasket groove 20, and between the inner plate edge 26 and the gasket groove 20, respectively, are corrugated so as to comprise alternately arranged ridges 34 and valleys 36 (see FIG. 2 and FIGS. 3 and 6 for the outer edge portion 28). Ridges and valleys as seen from one side of the heat transfer plate 4 are valleys and ridges, respectively, as seen from the other side of the heat transfer plate 4. Obviously, also the portholes portholes 12 and 16 are enclosed by a respective similar corrugated inner edge portion.

With reference especially to FIG. 2, the outer edge portion 28 of the heat transfer plate 4 comprises a plurality of outer gasket fastening areas 44 distributed along the outer plate edge 22. At least some of the gasket fastening areas 44 are designed according to the present invention. For the sake of completeness it should be said that also the inner edge portions of the heat transfer plate 4 comprise a plurality of inner gasket fastening areas distributed around the portholes 12, 14, 16 and 18. However, these are conventionally designed and will not be further described herein.

One of the gasket fastening areas 44 designed according to the present invention is illustrated in more detail in FIG. 6. It comprises first and second valleys 36*a* and 36*b* of the valleys 36 and first, second and third ridges 34*a*, 34*b* and 34*c* of the ridges 34. The first and second ridges 34*a* and 34*b* are arranged on opposite sides of the first valley 36*a*, the first and second valleys 36*a* and 36*b* are arranged on opposite sides of the second ridge 34*b*, and the second and third ridges 34*b* and 34*c* are arranged on opposite sides of the second valley 36*b*.

With reference to FIGS. 4-6, the majority of the ridges 34 within the outer edge portion 28 of the heat transfer plate 4 are designed like the right-most ridges 34 in FIG. 6, which have an essentially constant width along their longitudinal extension and a respective top portion 38 extending in an imaginary top plane TP. Similarly, the majority of the valleys 36 within the outer edge portion 28 of the heat transfer plate 4 are designed like the right-most valleys 36 in FIG. 6, which have an essentially constant width along their longitudinal extension and a respective bottom portion 40 extending in an imaginary bottom plane BP, which is arranged on a distance x from the top plane TP. However, the first, second and third ridges 34*a*, 34*b* and 34*c*, just like the first and second valleys 36*a* and 36*b*, of the gasket fastening area 44 are differently configured.

The first ridge 34*a* has a top portion 38*a*, which extends in an imaginary first plane P1 within a first portion r11 (the border of which is partly illustrated with a broken line) of the first ridge 34*a* arranged immediately adjacent to a first portion v11 of the first valley 36*a*, and in the top plane TP within a second portion r12 of the first ridge 34*a* partly arranged immediately adjacent to a second portion v12 of the first valley 36*a*. The border between the first and second portions v11 and v12 of the first valley 36*a* is illustrated with a broken line. The second portion v12 of the first valley 36*a* is arranged between the first portion v11 of the first valley 36*a* and the edge 22 of the heat transfer plate 4. Further, the second portion r12 of the first ridge 34*a* extends between the first portion r11 of the first ridge 34*a* and the edge 22 of the heat transfer plate 4, and on an outside of the first portion r11. The first plane P1 is parallel to the top and bottom planes TP and BP and extends at a distance xt from the top plane TP and a distance xb from the bottom plane BP, wherein $xt \leq x$ and $0 \leq xb < x$. Here, $xb=0$ and $xt=x$ which means that the first plane P1 coincides with the bottom plane BP. However, in alternative embodiments of the invention the first plane P1 could instead be arranged between the top plane TP and the bottom plane BP.

The reduced height of the top portion 38*a* of the first ridge 34*a* within the first portion r11 thereof results in a recess of the first ridge 34*a*. An inner section of the first portion r11 of the first ridge 34*a*, as seen from the edge 22 of the heat transfer plate 4, is tapered in a direction towards the gasket groove 20 so as to give this recess the essential shape of a triangle as seen from above the heat transfer plate 4, a side of which triangle is bordering on the first portion v11 of the first valley 36*a*.

The second ridge 34*b* has a a symmetry axis extending perpendicular to the outer edge 22 of the heat transfer plate 4 and a top portion 38*b* which extends in the top plane TP. The second ridge 34*b* comprises a first portion r21 with a first width wp21 and a second portion r22 with a second width wp22. The second portion r22 is arranged between the first portion r21 and the edge 22 of the heat transfer plate 4, and the border between the first and second portions r21 and r22 is illustrated with a broken line. Further, the first width wp21 of the first portion r21 is constant along essentially the complete length of the first portion r21. On the contrary, the second portion r22 is tapered in a direction away from the edge 22 of the heat transfer plate 4 resulting in a varying second width wp22 of the second portion r22. The first width wp21 of the first portion r21 is smaller than the second width wp22 of the second portion r22.

As is clear from FIG. 6, the third ridge 34*c* is designed in a corresponding way as the first ridge 34*a*.

The first valley 36*a* has a bottom portion 40*a* which extends in the bottom plane BP. A longitudinal outer side 42 of the first valley 36*a* is straight and extends perpendicular to the edge 22 of the heat transfer plate 4 along essentially the complete length of the first valley 36*a*, and especially along the length of the second portion v12 of the first valley 36*a*. Thereby, since the second portion r22 of the second ridge 38*b*, as said above, is tapered in a direction away from the edge 22 of the heat transfer plate 4, the second portion v12 of the first valley 36*a* will be tapered in a direction towards the edge 22 of the heat transfer plate 4.

As is clear from FIG. 6, the second valley 36*b* is designed in a corresponding way as the first valley 36*a*.

Here, with reference to FIGS. 4 and 5, a bottom 46 of the gasket groove 20 extends in the imaginary bottom plane BP along a major part of gasket groove 20. However, in other embodiments of the invention, the gasket groove bottom 46 could instead, along a major part of gasket groove 20, extend in an imaginary intermediate plane extending between, possibly half way between, the top and bottom planes TP and BP. As is clear from FIGS. 4-6, the ridges 34 are closed towards the gasket groove 20 and arranged to provide gasket support, while the valleys 36 are open towards the gasket groove 20.

With reference initially to FIGS. 1 and 2, the gasket arrangement 6 comprises a rubber gasket 48, which in turn comprises an annular field portion 50, two annular ring portions 52 and 54 and bridges 56 connecting the ring portions 52 and 54 to the field portion 50. The gasket arrangement 6 further comprises a plurality of rubber attachment means 58 integrally formed with the gasket 48. The attachment means 58 are distributed along an outer side of the field portion 50 of the gasket 48. At least some of the attachment means 58 are designed according to the present invention. For the sake of completeness it should be said that the gasket arrangement 6 comprises attachment means also along an inner side of the ring portions 52 and 54 and an inner side of the field portion 50. However, these are conventionally designed and will not be further described herein.

Figure 7:
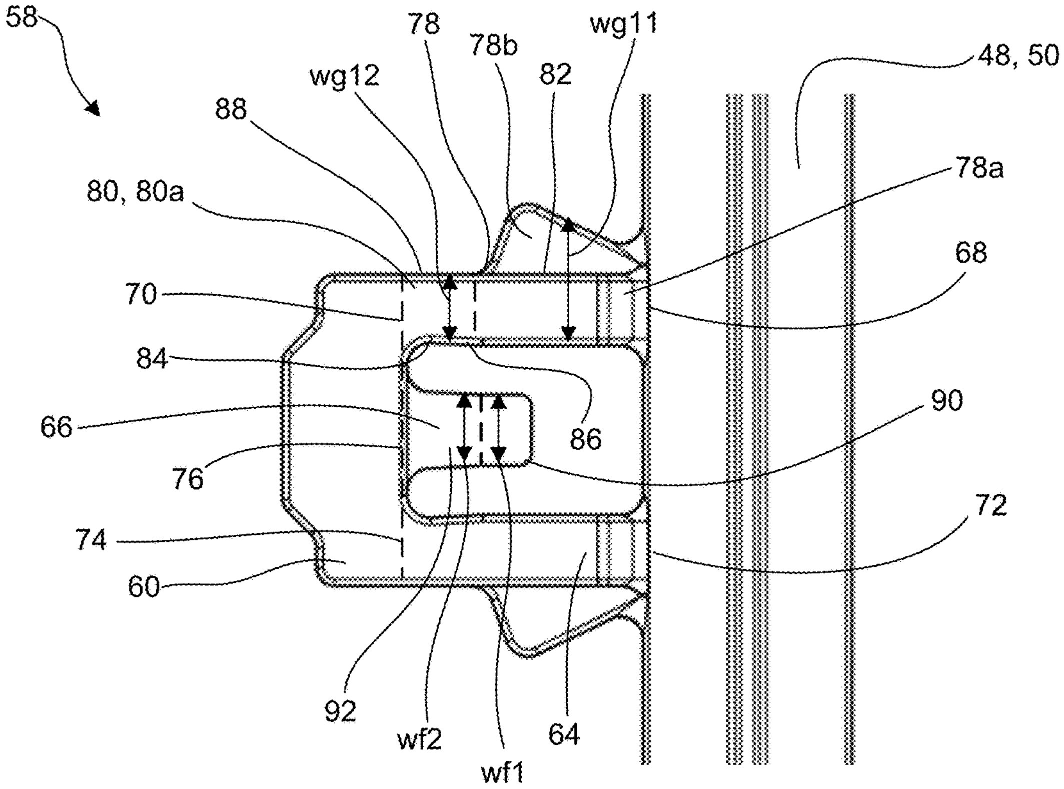
FIG. 7 illustrates a plan view of an attachment means of the gasket arrangement in FIG. 1.
Figure 8:
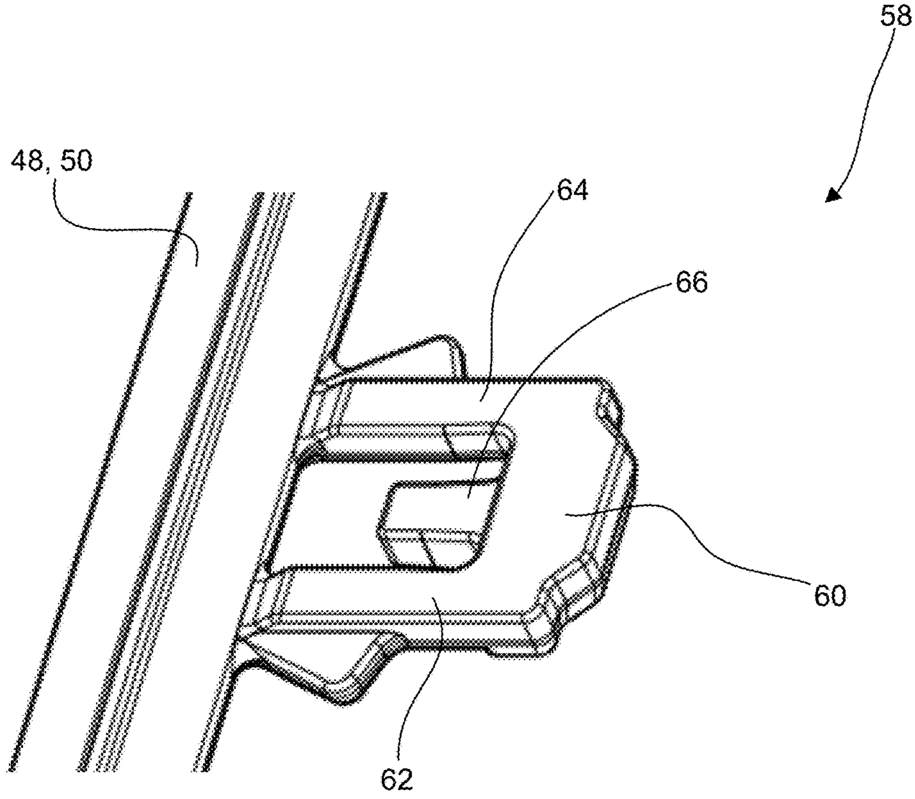
FIG. 8 illustrates a perspective view of the attachment means in FIG. 7, and FIG. 9 schematically illustrates the reliable engagement between the gasket arrangement and heat transfer plate of FIG. 1.

One of the attachment means 58 designed according to the present invention is illustrated in more detail in FIGS. 7 and 8. It comprises an elongate bridge 60, a first connection member 62, a second connection member 64 and a finger 66. The border of the bridge 60 towards the first and second connection members 62 and 64 and the finger 66 is illustrated with a broken line in FIG. 7. The bridge 60 longitudinally extends essentially parallel to the gasket 48 at a distance therefrom. The first connection member 62 longitudinally extends essentially perpendicular to the bridge 60 and from an end portion thereof to connect the bridge 60 to the gasket 48. More particularly, a first connection part 68, in the form of an end, of the first connection member 62 is connected to the gasket 48, while a second connection part 70, in the form of another end, of the first connection member 62 is connected to the bridge 60. Similarly, the second connection member 64 longitudinally extends essentially perpendicular to the bridge 60 and from another opposite end portion thereof to connect the bridge 60 to the gasket 48. More particularly, a first connection part 72, in the form of an end, of the second connection member 64 is connected to the gasket 48, while a second connection part 74, in the form of another end, of the second connection member 64 is connected to the bridge 60. The finger 66 longitudinally extends essentially perpendicular to the bridge 60 and from a center portion thereof, i.e. between the first and second connection members 62 and 64, towards the gasket 48. More particularly, a connection part 76, in the form of an end, of the finger 66 is connected to the bridge 60, while another end of the finger 66 is free and arranged at a distance from the gasket 48.

The first connection member 62 comprises a first portion 78 and a second portion 80. The second portion 80 borders on the bridge 60 of the attachment means 58 while the first portion 78 borders on the gasket 48. In FIG. 7 the border between the first and second portions 78 and 80 are illustrated with a broken line. In turn, the first portion 78 of the first connection member 62 comprises a first body 78*a* and a first retaining means 78*b*, while the second portion 80 comprises a second body 80*a*. The first retaining means 78*b* projects from a longitudinal outer side 82 of the first body 78*a* in a direction away from the finger 66 and the second connection member 64. An inner section of the first retaining means 78*b*, as seen from the bridge 60, is tapered in a direction towards the gasket 48 so as to give the first retaining means 78*b* the essential shape of a triangle as seen from above the attachment means 58, a side of which triangle is bordering on the first body 78*a* of the first portion 78 of the first connection member 62. A thickness of the first body 78*a* exceeds a thickness of the first retaining means 78*b*.

The first retaining means 78*b* gives the first portion 78 of the first connection member 62 a varying first width wg11 which is larger than a second width wg12 of the second portion 80 of the first connection member 62. Also the second width wg12 of the second portion 80, and thus a width of the second body 80*a*, is varying. The second body 80*a* comprises, close to the bridge 60, a recess 84 at a longitudinal inner side 86, while a longitudinal outer side 88 of the second body 80*a* is straight and extends perpendicular in relation to the bridge 60.

As is clear from FIGS. 7 and 8, the second connection member 64 is designed in a corresponding way as the first connection member 62.

Further, the finger 66, which has a symmetry axis extending perpendicular to bridge 60 and through a center thereof, comprises a first portion 90 and a second portion 92. The second portion 92 borders on the bridge 60 of the attachment means 58, and the first portion 90 is arranged between the second portion 92 and the gasket 48. In FIG. 7 the border between the first and second portions 90 and 92 is illustrated with a broken line. The first and second portions 90 and 92 have a width wf1 and wf2, respectively, wherein the first width wf1 is smaller than the second width wf2. The first width wf1 is constant along essentially the complete length of the first portion 90. The second portion 92 is tapering in a direction away from the bridge 60 which makes the second width wf2 varying.

Figure 9:
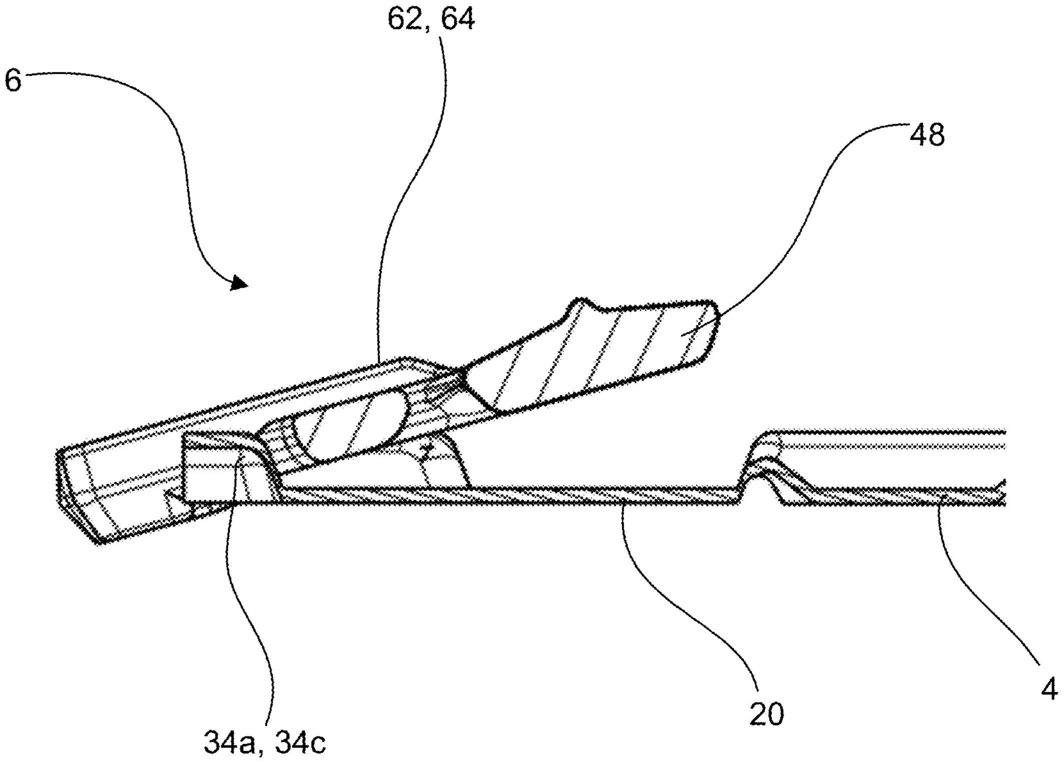

The gasket groove 20 of the heat transfer plate 4 is arranged to accommodate the gasket 48, as is illustrated in FIG. 1. Further, the gasket fastening areas of the heat transfer plate 4, are arranged to cooperate with the attachment means of the gasket arrangement 6 to fasten the gasket 48 to the heat transfer plate 4. The cooperation between one of the gasket fastening areas 44 according to the invention and one of the attachment means 58 according to the invention is illustrated especially in FIGS. 3-5. It should be said that the heat transfer plate 4, in some of the figures and especially FIG. 3, and for illustrative purposes, is partly transparently illustrated With special reference to FIG. 3, when the attachment means 58 engages properly with the gasket fastening area 44, the first and second connection members 62 and 64 engages with the first side 8 of the heat transfer plate 4 while the finger 66 engage with the second side 10 (FIGS. 4 and 5) of the heat transfer plate 4. More particularly, the finger 66 is received in a valley defined by the second ridge 34*b*. Further, the first and second bodies 78*a* and 80*a* of the first connection member 62 are received in the first valley 36*a*, while the first retaining means 78*b* of the first connection member 62 is received in the first portion r11 of the first ridge 34*a*. The second connection member 64 is received in a corresponding way in the second valley 36*b* and the third ridge 34*c*. Further, the bridge 60 of the attachment means 58 extends outside the heat transfer plate 4 parallel to the outer edge 22 thereof. The configurations of the first and second connection members 62 and 64 of the attachment means 58 and the first, second and third ridges 34*a*, 34*b* and 34*c*, as well as the first and second valleys 36*a* and 36*b*, of the gasket fastening area 44 are complementary. Thus, the first connection member 62 tightly fits into, and essentially fills up, the entire first valley 36*a* and the first portion r11 of the first ridge 34*a*. Correspondingly, the second connection member 64 tightly fits into, and essentially fills up, the entire second valley 36*b* and a first portion or recess of the third ridge 34*c*. Thereby, the attachment means 58 is prevented from sliding in a direction parallel to the extension plane of the heat transfer plate 4, especially perpendicular to the outer edge 22 of the heat transfer plate 4. Consequently, a reliable fastening of the gasket 48 to the heat transfer plate 4 is achieved. Even in a case where the the gasket 48 loses contact with the gasket groove 20, the gasket arrangement 6 may be prevented from sliding off the heat transfer plate 4. This is illustrated in FIG. 9 which shows how the engagement between the first and second connection members 62 and 64 and the first and third ridges 34*a* and 34*c* is maintained even if the gasket arrangement 6 is tilted in relation to the heat transfer plate 4.

The above described embodiment of the present invention should only be seen as an example. A person skilled in the art realizes that the embodiment discussed can be varied in a number of ways without deviating from the inventive conception.

As an example, the first retaining means of the first connection member need not have the essential shape of a triangle but could have any suitable shape.

As another example, only one of the connection members may comprise a retaining means while the other connection member lacks a retaining means.

The components of the gasket fastening area and the components of the attachment means having varying widths need not be tapered to achieve the varying widths. For example, the width variations may be more abrupt and instantaneous and take place step wise instead of gradually.

The finger may be tapered along its complete longitudinal extension instead of only along a portion thereof. Further, the finger need not be tapered in a direction away from the bridge, but could instead be tapered in a direction towards the bridge, along its complete, or just a part of, its longitudinal extension. The heat transfer plate could have gasket fastening areas designed for cooperation with an attachment means comprising such a finger.

As another example, the finger and/or the first and second connection members need not extend parallel to each other and/or perpendicularly to the bridge. Consequently, the first and second valleys and the first, second and third ridges need not longitudinally extend parallel to each other and perpendicular to the outer plate edge.

The above described heat transfer plate has the inventive gasket fastening areas arranged along an outer plate edge and along two opposing longsides of the heat transfer plate. Consequently, the above described gasket arrangement has the inventive attachment means arranged along two opposing longsides of the field portion of the gasket, projecting from an outer side thereof. Naturally, the inventive gasket fastening areas could also/instead be arranged along two opposing short sides of the heat transfer plate, and/or along an inner plate edge, i.e. around a porthole of the heat transfer plate. Consequently, the inventive attachment means could also/instead be arranged along two opposing shortsides of the field portion of the gasket, and/or along a ring portion of the gasket, projecting from an inner side thereof.

The inventive attachment means could comprise more than one finger extending between the first and second connection members and arranged to extend from the bridge of the attachment means towards the gasket. The heat transfer plate could have gasket fastening areas designed for cooperation with such an attachment means.

The attachment means need not be designed in such a way that the bridge thereof is arranged to be positioned outside the heat transfer plate when the attachment means engage properly with the heat transfer plate. Instead, the bridge could be designed to be at least partly positioned within the heat transfer plate, and possibly engage with the first and/or the second side of the heat transfer plate, when the attachment means engage properly with the heat transfer plate. The heat transfer plate could have gasket fastening areas designed for cooperation with such an attachment means.

The connection members of the above attachment means extend from the bridge to the gasket but they could instead extend beyond the bridge and/or the gasket. Similarly, the finger could extend beyond the bridge and/or the gasket. The heat transfer plate could have gasket fastening areas designed for cooperation with such an attachment means.

The gasket and the attachment means need not be integrally formed but could be two separate but connectable parts. Further, the gasket and attachment means need not be made of rubber but can be made of any suitable material. Further, the gasket and attachment means need not be of the same material.

The heat transfer plate need not be made of stainless steel but could be made of any suitable material, such as titanium or aluminium.

Finally, the present invention could be used in connection with other types of plate heat exchangers than purely gasketed ones, e.g. plate heat exchangers comprising permanently joined heat transfer plates.

It should be stressed that plate pressing typically results in plate corrugations having some curvature radius instead of sharp edges. Therefore, the heat transfer plate will typically comprise corrugations in an essential, instead of an exact, form of different geometrical figures, such as s triangle. A corresponding reasoning is valid for moulding of the gasket arrangement.

It should be stressed that the attributes first, second, third, etc. is used herein just to distinguish between species of the same kind and not to express any kind of mutual order between the species.

It should be stressed that a description of details not relevant to the present invention has been omitted and that the figures are just schematic and not drawn according to scale. It should also be said that some of the figures have been more simplified than others. Therefore, some components may be illustrated in one figure but left out on another figure.

The invention claimed is:

1. An attachment member for fastening a gasket to a heat transfer plate, comprising a bridge, a first connection member, a second connection member and a finger, a first connection part of the first connection member being arranged to engage with the gasket, a second connection part of the first connection member engaging with the bridge, a first connection part of the second connection member being arranged to engage with the gasket, a second connection part of the second connection member engaging with the bridge, a connection part of the finger engaging with the bridge, the finger extending between the first and second connection members and being arranged to extend from the bridge towards the gasket, the first connection member comprising a first and a second portion, the second portion being arranged between the bridge and the first portion, wherein the second portion of the first connection member comprises a second body and the first portion of the first connection member comprises a first body and a first retainer projecting from a longitudinal outer side of the first body in a direction away from the finger so as to give the first portion of the first connection member a first width which is larger than a second width of the second portion of the first connection member, and wherein the first retainer of the first portion of the first connection member is tapered in a direction away from the bridge along at least part of its length.

2. The attachment member according to claim 1, wherein the first retainer has the essential shape of a triangle as seen from above the attachment member, the first retainer being connected to the first body along one side of the triangle.

3. The attachment member according to claim 1, wherein the second body has a smallest width which is smaller than a largest width of the first body.

4. The attachment member according to claim 1, wherein a longitudinal outer side of the second body is essentially straight and extends essentially perpendicular in relation to a length extension of the bridge.

5. The attachment member according to claim 1, wherein the finger comprises a first portion with a first width and a second portion with a second width, the second portion being arranged closer to the bridge than the first portion, and the first width being smaller than the second width.

6. The attachment member according to claim 5, wherein the finger is tapered in a direction away from the bridge along at least part of its length.

7. The attachment member according to claim 1, wherein a maximum thickness of the first body is larger than a maximum thickness of the first retainer.

8. A heat transfer plate comprising, on a first side thereof, a gasket groove extending along an edge of the heat transfer plate, an edge portion of the heat transfer plate extending between the edge and the gasket groove and being corrugated so as to comprise, as seen from the first side of the heat transfer plate, alternately arranged ridges, which comprise a respective top portion, and valleys, which comprise a respective bottom portion, the edge portion comprising a gasket fastening area arranged to engage with an attachment member for fastening a gasket in the gasket groove, the gasket fastening area comprising first and second ones of the valleys and first and second ones of the ridges, the first and second ridges being arranged on opposite sides of the first valley, and the first and second valleys being arranged on opposite sides of the second ridge, the bottom portion of the first valley extending in a bottom plane and the top portion of the first ridge extending in a first plane within a first portion of the first ridge bordering on a first portion of the first valley, and in a top plane in a second portion of the first ridge bordering on a second portion of the first valley so as to extend between the first portion of the first ridge and the edge of the heat transfer plate, the top and bottom planes being separated by a distance x, and the first plane extending essentially parallel to the top and bottom planes and at a distance xt from the top plane and a distance xb from the bottom plane, wherein $xt \leq x$ and $0 \leq xb < x$, and wherein the first portion of the first ridge has an essential shape of a triangle as seen from above the heat transfer plate, the first portion of the the first ridge bordering on the first portion of the first valley along one side of the triangle.

9. The heat transfer plate according to claim 8, wherein the first portion of the first ridge is tapered in a direction away from the edge of the heat transfer plate along at least part of its length.

10. The heat transfer plate according to claim 8, wherein the second portion of the first valley, which second portion is arranged between the first portion of the first valley and the edge of the heat transfer plate, has a smallest width which is smaller than a largest width of the first portion of the first valley.

11. The heat transfer plate according to claim 8, wherein a longitudinal outer side of the first valley, within the second portion of the first valley, is essentially straight and extends essentially perpendicular in relation to the edge of the heat transfer plate.

12. The heat transfer plate according to claim 8, wherein the second ridge comprises a first portion with a first width and a second portion with a second width, the second portion being arranged between the first portion and the edge of the heat transfer plate, and the first width being smaller than the second width.

13. The heat transfer plate according to claim 12, wherein the second ridge is tapered in a direction away from the edge of the heat transfer plate along at least part of its length.

* * * * *